(No Model.) 3 Sheets—Sheet 3.
P. W. POWER.
DYNAMO ELECTRIC MACHINE.
No. 596,306. Patented Dec. 28, 1897.
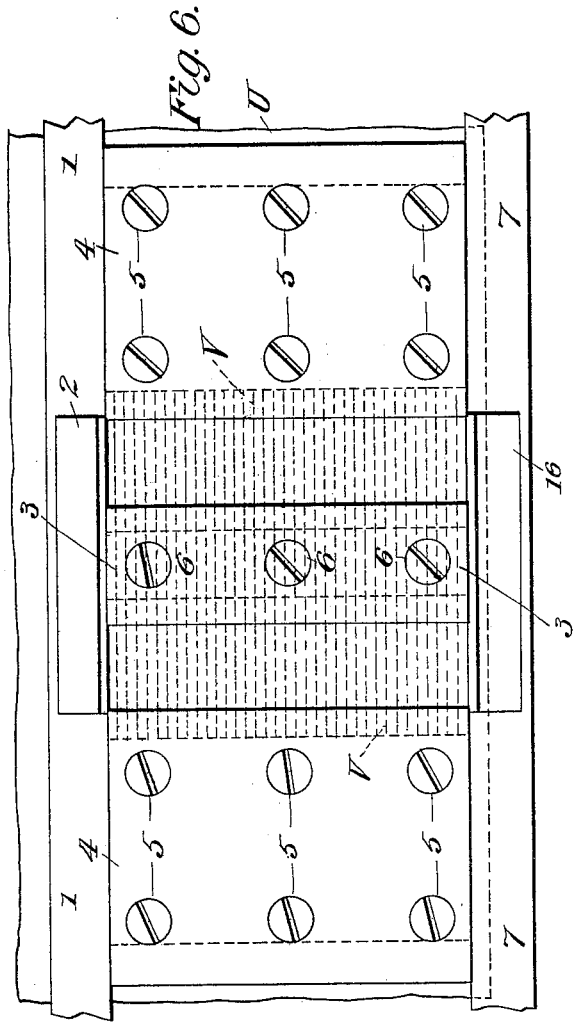
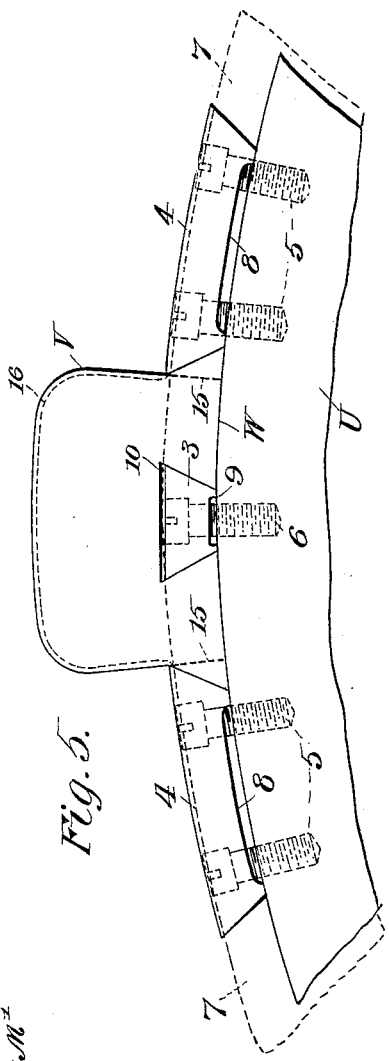
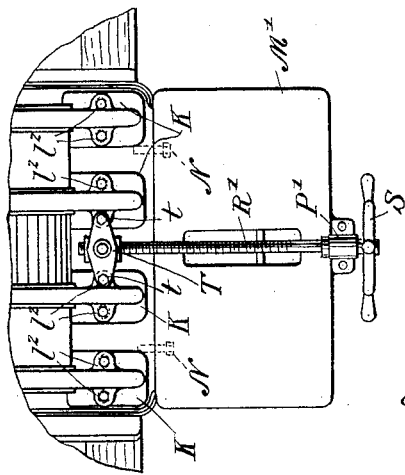
WITNESSES:
Frank S. Ober
H. M. Skinner
INVENTOR
Pomeroy W. Power
BY
H. B. Brownell
ATTORNEY

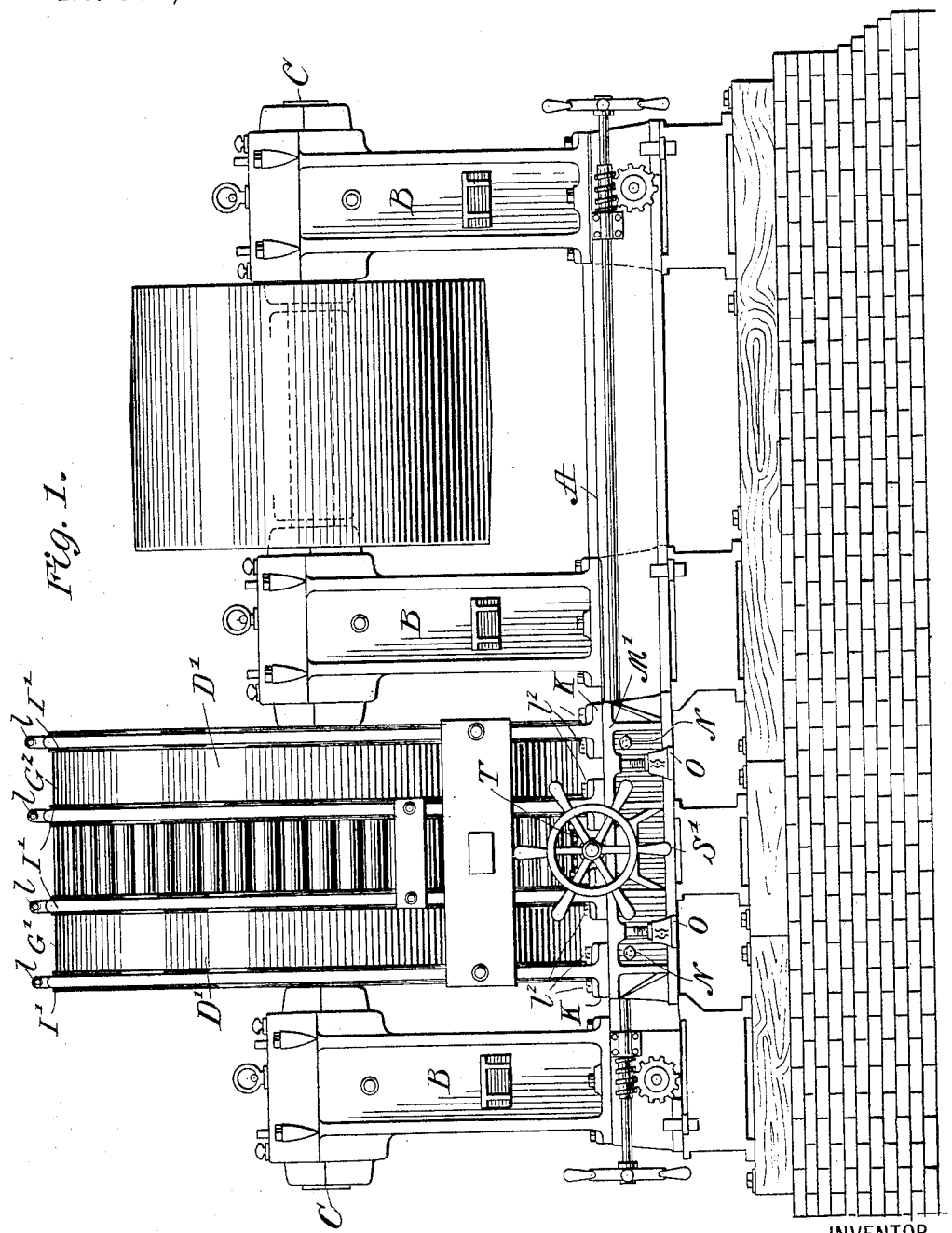

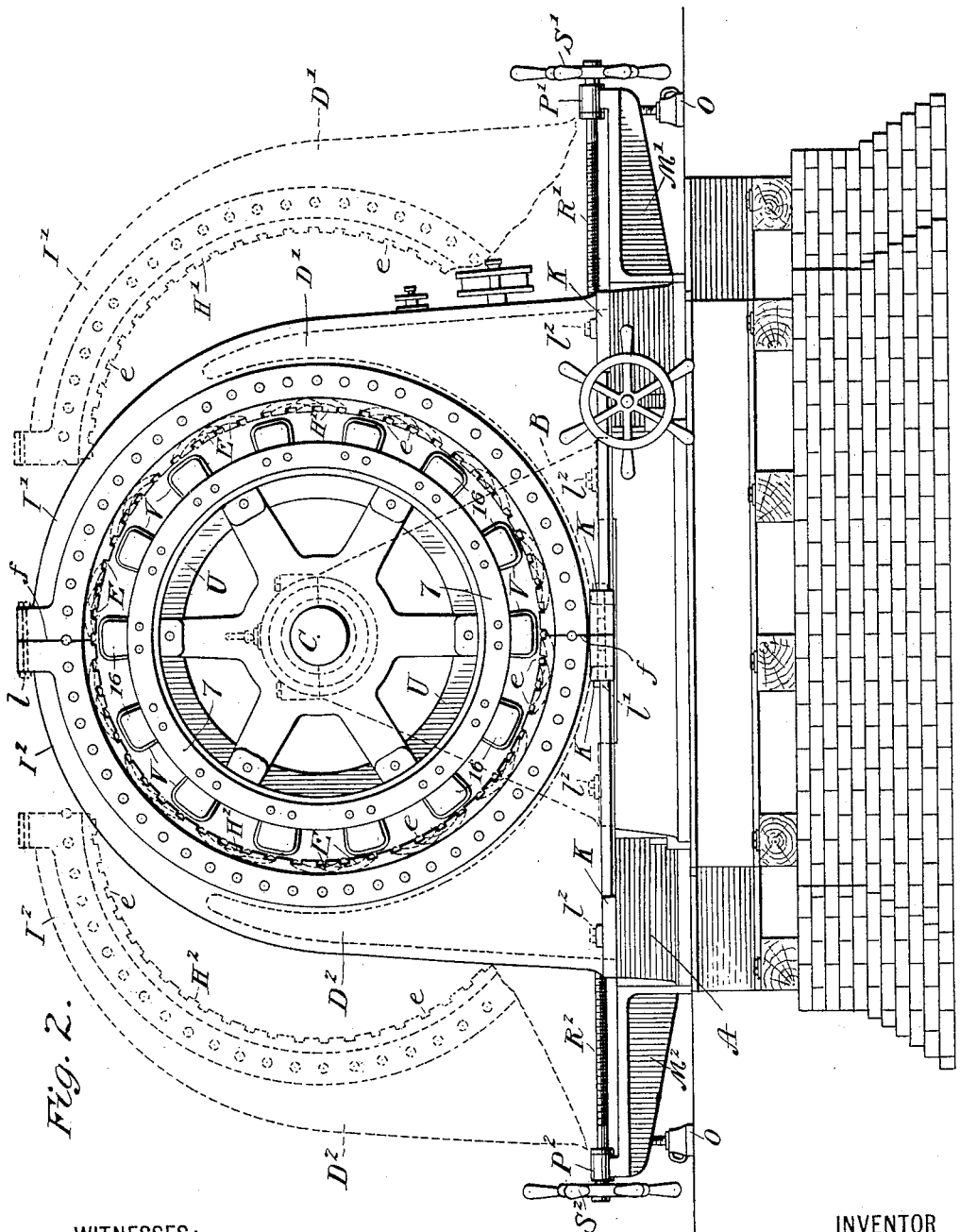

UNITED STATES PATENT OFFICE.

POMEROY W. POWER, OF PITTSFIELD, MASSACHUSETTS, ASSIGNOR TO THE STANLEY ELECTRIC MANUFACTURING COMPANY, OF SAME PLACE.

DYNAMO-ELECTRIC MACHINE.

SPECIFICATION forming part of Letters Patent No. 596,306, dated December 28, 1897.

Application filed February 12, 1896. Serial No. 578,996. (No model.)

*To all whom it may concern:*

Be it known that I, POMEROY W. POWER, a citizen of the United States, residing at Pittsfield, county of Berkshire, and State of Massachusetts, have invented certain new and useful Improvements in Dynamo-Electric Machines, of which the following is a specification.

My invention relates to dynamo-electric machines having a stationary armature and armature-coils. The general arrangement of a machine of that class is shown in United States Patent to William Stanley, Jr., and John F. Kelly, No. 499,446, dated June 13, 1893. Such machines may be used as generators or motors and, so far as the current used or generated is concerned, may be either single or double phase, according to the winding and connections, as is well known by those skilled in the art. Armatures in this class of machines may have two crowns or circles of stationary coils supported by laminated rings or may have a single crown or circle, in which case the corresponding end of the inductor has polar projections, while the other end has a plain cylindrical surface with no polar projections, the ring corresponding to that end having its opposing surface smooth also.

My invention has for its object to provide a new construction for the rotating inductor in inductor-machines and a means for securely and simply fastening the polar projections in place upon the inductor-core in such machines. I attain these objects by mechanism shown in the accompanying drawings, in which—

Figure 1 is a side elevation. Fig. 2 is an end elevation with parts shown in detail. Fig. 3 is a detail plan of a wing-table with its immediately surrounding parts. Fig. 4 is an elevation of a detail. Fig. 5 is an elevation of a portion of the inductor, showing a pole-piece attached; and Fig. 6 is a plan of the same portion, showing the laminated pole-piece in dotted lines.

In the drawings the base A supports the standards B B B for the bearings of the shaft C. Upon this base A there rest two separable parts $D'\ D^2$ of the stationary armature, the plane of division passing through the axis of the shaft C and cutting the armature at $f\ f$ and being parallel to the lines of force at the points of division. These parts $D'\ D^2$ carry the stationary armature-coils E E, which appear in dotted lines. These coils are placed in the grooves $e\ e$ in the manner shown, no one coil, however, being in two grooves on opposite sides of the points of division of the armature.

The machine shown in the drawings is intended to represent one in which there are in the armature two rings $G'\ G^2$, each having on its interior surface a crown or circle of coils similar to those shown in the drawings at E in Fig. 2. It will, however, be understood that for the purposes of this invention it is immaterial whether one or two crowns be used, although the different constructions will permit somewhat different embodiments of the invention.

The parts $G'\ G^2$ of the stationary armature each consist of semicircular laminated portions $H'\ H^2$, within which are the grooves $e\ e$ for the armature-coils. Each of these portions $H'\ H^2$ is supported by an iron framework $I'\ I^2$, which is made up of several parts which broaden out at points K K, so as to rest securely on the base A. The framework, when the machine is in operation, is bolted together, top and bottom, at $l\ l'$ and to the base at $l^2$. When this divided armature is used in the large-sized machines, it is necessary that some special means be provided for separating and bringing together the parts of the armature. In small sizes this is not necessary, and in such cases the plane of division is usually horizontal, the upper part being removed or adjusted by the use of a block and tackle. The special means which I have invented for the large-sized machines consist of the wing-tables $M'\ M^2$, attached, preferably removably, to the base A. As shown, they are removably attached by bolts N N, the outer ends being supported by small jacks O O. At the outer edge of these wing-tables are bearings $P'\ P^2$ for screws $R'\ R^2$, having the handles $S'\ S^2$ for turning them. The threaded portion of the screws $R'\ R^2$ engage with threaded blocks T, which are fastened to the inner parts of the frame at $t\ t$. By this means when the bolts $l, l'$, and $l^2$ are removed either part of the armature can be drawn bodily away from the inductor, as shown in dotted lines in Fig. 2, or pushed toward it, the table and base acting as a way and a resting-place.

The coil for energizing the inductor surrounds it and may be supported in any of the manners well known in the art. If it is normally supported by the armature, it is made so that it can easily go out of or into position when the parts of the armature are separated or brought together, and so that when not supported by the armature it rests upon the inductor or is supported by some temporary external means. A machine with an armature so constructed is easily inspected, cleaned, and repaired, and has many advantages in the matter of assembling, both as to its various parts and as to the machine as a whole. When the machine is provided with the wing-tables and operating mechanism, the construction is particularly advantageous in machines of very large size.

Another feature of my improved machine is the manner of fastening the pole-pieces to the periphery of the inductor-core, which is particularly adapted to machines of the class shown herein. The inductor in the machine shown in the drawings consists of a body having a cylindrical surface, on which are two rows of polar projections.

In the drawings, U represents the inductor with the polar projections V V. These are shown on an enlarged scale in Figs. 5 and 6.

W is the cylindrical periphery of the inductor-core. In Fig. 5 the bottom of the figure represents one end, while the top represents the portion facing the other row of polar projections. Just within the row of polar projections is a retaining-ring 1, having extensions 2 conforming somewhat to their faces. On the periphery of the inductor-core at proper intervals just outside this ring are iron dovetails 3 and 4, fastened by screws 5 and 6, respectively, forming dovetail spaces between them. The pole-pieces V are made of laminations of iron having dovetail projections corresponding to the spaces between dovetails 3 and 4 and a recess corresponding to the dovetail 3. With this construction the dovetail 3 is first put in position and then the pole-piece slid over it, after which the dovetails 4 4 are secured in place. On the end of the inductor outside the pole-pieces 6 a second ring 7, (shown in dotted lines in Fig. 5,) also having projections 16, corresponding somewhat closely to the polar projections, is secured, the whole making a strong and simple means of connecting the projecting pole-pieces with their inductor core or cylinder. The inductor-core can with this construction be made massive and not laminated, the only portions of the inductor where lamination is essential being the polar projections.

In some cases I prefer to use the dovetails 3 without the dovetails 4 4 to hold to the projections, as in that case a greater depth between the polar projections is secured, and in consequence there is less magnetic leakage, and a better curve for the electromotive force is obtained. When the dovetails 4 4 are not used, the sides of the polar projections are preferably straight, as shown in dotted lines at 15. The dovetails and spaces may be T-shaped.

In order to utilize advantageously as far as possible the attractive magnetic force in the various parts of the inductor and also to insure less loss by leakage, the dovetails 3 and 4 are so shaped as to form air-gaps in any magnetic circuit passing through them in the general direction of the main magnetic flux. These gaps are formed by the hollows 8 and 9 and by the space 10. It will be seen that all these gaps tend to make the lines of force pass directly from the inductor-core to the polar projections, which, aside from preventing leakage through the dovetails 4 4 by concentrating the lines of force passing through the inductor-core at the points of contact of the polar projection, increasing the magnetic attraction directly between the core and the projection, which assists to a material degree in holding the projections in position against centrifugal force and the magnetic attraction between the opposing surfaces of the polar projections and the armature.

What I claim as my invention, and desire to secure by Letters Patent, is—

1. In a dynamo-electric machine having a rotating inductor, laminated polar projections separately fastened to the inductor-core by dovetail fastenings, substantially as described.

2. In a dynamo-electric machine having a rotating inductor, polar projections fastened to the inductor-core by dovetails, the core and the dovetails having air-gaps between them, substantially as described.

In testimony whereof I have hereunto set my hand this 10th day of February, 1896.

POMEROY W. POWER.

Witnesses:
W. H. LELAND,
A. M. CURTIN.